United States Patent [19]
Kolff et al.

[11] Patent Number: 5,632,623
[45] Date of Patent: May 27, 1997

[54] MOCK CIRCULATION SYSTEM

[75] Inventors: Willem J. Kolff; N. Dan Bishop; Stephen R. Topaz; Ban Y. Chiang, all of Salt Lake City, Utah

[73] Assignee: University of Utah Research Foundation, Salt Lake City, Utah

[21] Appl. No.: 364,957

[22] Filed: Dec. 28, 1994

[51] Int. Cl.$^6$ .................................................. G09B 23/28
[52] U.S. Cl. ........................ 434/272; 434/267; 73/866.4
[58] Field of Search .................................. 434/265, 267, 434/268, 272; 73/168, 866.4, 37

[56] References Cited

U.S. PATENT DOCUMENTS

| | | |
|---|---|---|
| 2,556,043 | 6/1951 | Roucka . |
| 2,871,579 | 2/1959 | Niiranen et al. .......................... 434/268 |
| 3,178,833 | 4/1965 | Gulbransen, Jr. et al. . |
| 3,376,660 | 4/1968 | Ginnis . |
| 3,579,858 | 5/1971 | Bentov . |
| 3,631,607 | 1/1972 | Kolff et al. . |
| 3,704,528 | 12/1972 | Lewis ...................................... 434/268 |
| 4,902,291 | 2/1990 | Kolff . |
| 5,176,153 | 1/1993 | Eberhardt . |
| 5,272,909 | 12/1993 | Nguyen et al. ..................... 73/866.4 X |

*Primary Examiner*—Jeffrey A. Smith
*Attorney, Agent, or Firm*—Thorpe, North & Western

[57] ABSTRACT

A mock circulation system is provided including a collapsible housing having a plurality of channels formed therein so as to represent the arteries, veins and organs of a human circulatory system. A pair of artificial ventricles are connected to the housing and pump fluid through the housing so as to develop circulation within the housing. By using a plurality of flow-restricting devices, and by modifying the pumping of the artificial ventricles, a variety of circulatory conditions (both healthy and pathogenic) can be simulated within the system. In accordance with the principles of the invention, cardiac massage may be demonstrated by manually squeezing the artificial ventricles. In accordance with another principle of the invention, Starling's Law Curves may be generated to show that cardiac output is determined by venous pressure.

19 Claims, 4 Drawing Sheets

MOCK CIRCULATION SYSTEM

BACKGROUND OF THE INVENTION

The present invention relates to a mock circulation system, and in particular to a mock human circulation system for use in teaching and testing of circulation related medical devices.

Each year nearly 35,000 people in the United States die from irreparable heart failure, and there are less than 2,000 hearts which may be used for transplants. In order to save many of these people, scientists have developed artificial ventricles and ventricle assist devices. Before these devices can be used, tests must be performed to determine whether the devices will function as desired. Thus, each model must be tested, initially in a mock circulation system, and eventually in animals and finally people.

Presently there are numerous mock circulation systems on the market. Many of these systems are used to test prosthetic devices, such as artificial valves and hearts, and also to test the reliability of other medical equipment, such as transducers used to determine blood pressure at specific locations. Other mock circulation systems are designed primarily to serve as teaching aids, and serve little experimental purpose. Such systems are usually used to teach students at elementary, secondary, and college levels, the workings of the human circulatory system.

A major problem with the mock circulation systems presently on the market is that their use for both these purposes is rather limited. Most of the systems merely show a portion of the circulatory system, thereby depriving the observer of the ability to visualize the complete system at work. Logically, this also reduces the reliability of the system as the mock circulation system only factors in isolated influences within the circulatory system, rather than the dynamic effects which changes can have on the system as a whole.

Another problem with many of the mock circulation systems of the prior art is that they are expensive, bulky, and are not readily portable. These factors limit their use, both by salespersons of medical devices and by educational institutions. Because of these problems, there is a general lack of understanding about the workings of the human circulation system and the dynamic effects which a change in one portion of the circulatory system can cause in the remainder in the system. This lack of understanding is not limited to students, but rather extends even to heart surgeons who replace valves and even whole ventricles in their patients.

To overcome these and other problems of the prior art, there is a need for a portable and inexpensive mock circulation system which can be used to test and demonstrate medical devices, as well as to teach the workings of a complete circulation system. Such a system would enable researchers and students alike to see the dynamic effects of changes within the circulation system.

SUMMARY OF THE INVENTION

It is an object of the present invention to provide a portable/compactible mock circulation system.

It is another object of the present invention to provide such a system which can use implantable prosthetic ventricles so that the system can be used for clinical trials and other experimentation.

It is another object of the present invention to provide a mock circulation system which can demonstrate the effect of right and left heart failure and the shifts of circulatory volume in the systemic and pulmonary circulation.

It is a further object of the present invention to provide a mock circulation system which can demonstrate portal hypertension.

It is yet another object of the present invention to provide a mock circulation system which simulates cirrhosis of the liver and Budd-Chiari Syndrome.

It is a further object of the present invention to provide a mock circulation system which can be used to demonstrate cardiac massage.

The above and other objects of the invention are realized in a specific illustrated embodiment of a mock circulation system including a collapsible housing having a plurality of channels formed therein to simulate the arteries, veins, etc., of a human circulatory system. Attached to the housing are a pair of artificial ventricles which are used to pump fluid through the channels, thereby replicating a human circulatory system. Because of the completeness of the system, many circulatory problems and disorders can be demonstrated.

In accordance with one aspect of the system, the artificial ventricles can be driven by a mechanized driver, by a hand pump or by cardiac massage to pump the fluid through the channels, thereby simulating human circulation.

In accordance with another aspect of the invention, colored markings can be placed on the channels to enable students and the like to differentiate between oxygenated "blood" and deoxygenated "blood" within the system.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
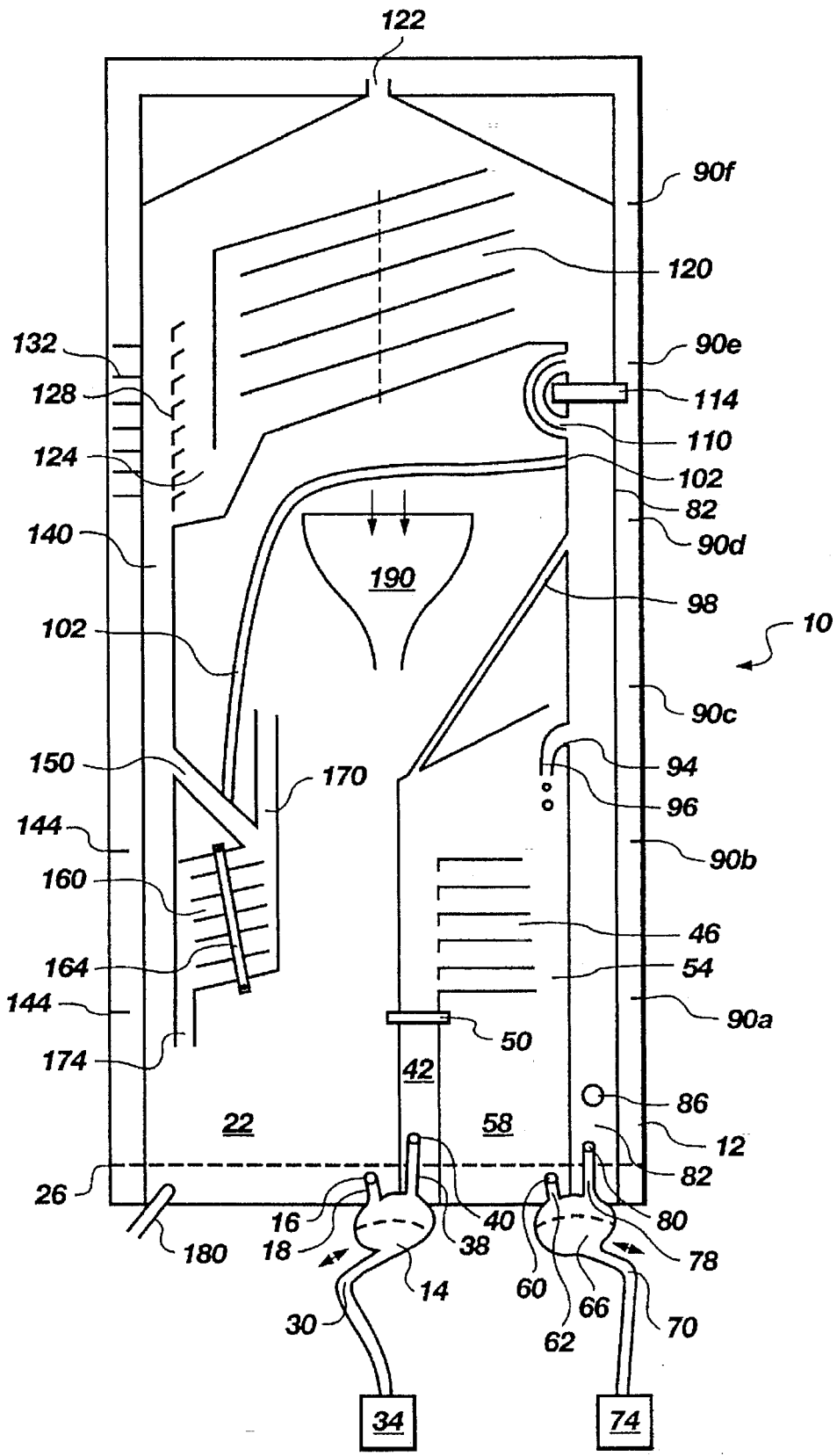
FIG. 1 shows a mock circulation system made in accordance with the principles of the present invention.

Reference will now be made to the drawings in which the various elements of the present invention will be given numeral designations and in which the invention will be discussed so as to enable one skilled in the art to make and use the invention. Referring to FIG. 1, there is shown a portable and inexpensive mock circulation system, generally indicated at 10, for use in teaching and demonstrating medical devices. The system 10 includes a housing 12 with a plurality of channels formed therein to simulate the flow of blood within a human body. Beginning at the bottom of the housing 12, attached thereto is shown a right ventricle 14. The right ventricle 14 is a "real" artificial ventricle, such as those which are implanted in experimental animals, and even humans. As will be appreciated by those skilled in the art, the ability to use "real" artificial ventricles and other medical devices renders the mock circulation system 10 more realistic than many of the prior art systems.

The right ventricle 14 has a stroke volume of about 40 cc so as to represent the cardiac output of a twelve-year old human. The right ventricle 14 is attached to an outlet port 16 of the housing 12 by a ventricle inlet 18. Through the ventricle inlet 18, the right ventricle 14 receives fluid from the right atrial reservoir 22. Preferably, the ventricle inlet 18 will have a biflap valve (not shown) as will be well known to those skilled in the art. The biflap valve is preferred because such valves have low resistance. As will be appreciated, however, other types of valves may be used, especially when the system is being used to test a new artificial ventricle. The ventricle inlet 18 is typically positioned a few millimeters below a baseline 26 representing pressures of 0 mm Hg. This allows the ventricle 14 to receive fluid at venous pressures as low as 0–1 cm of water without drawing in air. As will be appreciated, the right ventricle 14 will typically be held in a position in the same horizontal plane as the baseline 26.

The right ventricle 14 has an inlet/outlet line 30 for connection to some sort of driver 34. The driver 34 can be a mechanical pump or a hand pump. Either type of pump should be designed so that it does not "suck" fluid into the right ventricle 14. Rather, the filling of the right ventricle 14 should depend on venous-atrial pressure. Such an arrangement is also beneficial in that it allows for realistic cardiac massage. As the right ventricle 14 is squeezed and released, the fluid will circulate as if pumped by the driver 34. Thus, medical personnel can practice cardiac massage on a realistic model before the necessity of performing cardiac massage on a living patient arrives.

The right ventricle 14 expels fluid through a ventricle outlet 38, through an inlet port 40 of the housing 12, and into a channel 42 which represents the pulmonary artery. For ease of convenience, the channels, reservoirs, etc. which represent various parts of the system 10 will be referred to as the body part they represent. The ventricle outlet 38 of the right ventricle 14 will usually have a tricusp semilunar valve with sinus valsalvae as is present in the human aorta and pulmonary artery. However, other types of valves may be used for demonstration or testing purposes.

The pulmonary artery 42 leads from the right ventricle 14 to a plurality of channels 46 representing the lung. A clamp 50 is positioned along the pulmonary artery 42, between the right ventricle 14 and the lung 46, to adjust pressure, thereby enabling simulation of various circulatory conditions. A more detailed description of the clamp 50 is contained with respect to FIG. 3.

The lung 46 terminates in a channel 54 which leads down to the left atrial reservoir 58. Fluid in the left atrial reservoir 58 is drawn out of an outlet port 60 in the housing 12, through an ventricle inlet 62 and into the left ventricle 66. As with the ventricle inlet 18 of the right ventricle 14, the inlet 62 of the left ventricle 66 has a biflap valve (not shown) and is positioned to receive fluid a few millimeters below the baseline 26.

The stroke volume of the left ventricle is also 40 cc to be consistent with the model of a twelve-year old human. The left ventricle 66 is connected, via an inlet/outlet line 70, to a driver 74. Those skilled in the art will recognize that the driver 74 could be the same driver as 34 or a completely different type of driver. If drivers 34 and 74 are one in the same, it is advisable to provide a restriction device which restricts pressure toward the right ventricle 14, but does not restrict exhaust from either. If this is not done, the drive pressure for the right ventricle 14 tends to be somewhat abrupt. As will be appreciated, the ability to use different drivers allows the user to experiment with the drive of one ventricle, while keeping the drive of the other ventricle constant.

When driven, fluid in the left ventricle 66 is expelled through a ventricle outlet 78, through inlet port 80 of the housing 12, and into the channel 82 representing the aorta. A short distance above the outlet 78 is a port 86 which may be used for counterpulsation.

Disposed along the side of the aorta 82 are a plurality of markings, indicated at 90a through 90f. These markings indicate diastolic pressure in the aorta. For the model described, 90a represents a pressure of 10 mm Hg and 90f represents a pressure of 60 mm Hg. (1 mmHg.=1.36 cm $H_2O$).

Positioned along the aorta 82 are several exiting channels. Beginning with the lowest, the bronchial arteries 94 divert fluid from the aorta, past the lung 46 and back to the left atrium 58. While this flow is typically small, several conditions, such as Tetralogy of Fallot, stenosis of the pulmonary artery and beriberi, can cause the bronchial circulation to become quite large. Thus, it is important that the left ventricle 66 has a larger output than the right ventricle 14. Because the ventricles do not "suck in" fluid (i.e. create a negative pressure to draw in fluid), increased pressures in the left atrial reservoir 58 will cause the left ventricle 66 to pump a larger volume of fluid than is pumped by the right ventricle 14.

The ability to have a larger bronchial circulation flow is also beneficial for research purposes. Calves, the most common animal for testing artificial hearts, have considerable bronchial circulation. Thus, models can be postulated which factor in differences in bronchial circulation to adequately compensate for dissimilarities between human and bovine circulation systems. To simulate these conditions, the bronchial arteries 94 can have a regulator 96 for controlling the amount of flow through the arteries.

The exiting channel above the bronchial arteries 94 is the ductus arteriosus Botalli 98. The ductus Botalli 98 connects the aorta 82 to the pulmonary artery 42 and is open in humans before birth; normally closing after birth. In diving animals it generally remains open. The ductus Botalli 98 is typically very short in humans, but due to the nearly two dimensional structure of the housing, it is relatively long. The ductus Botalli 98 can be closed by applying pressure to it, or by preventing flow therethrough with a clamp or other restricting device which will be apparent to those skilled in the art.

Disposed above the ductus Botalli 98 is the hepatic artery 102, which connects the aorta 82 to the liver (discussed below). As will be appreciated by those skilled in the art, the flow of fluid through the hepatic artery 102 is relatively small and the artery may be omitted from some embodiments of the system to lessen manufacturing expenses, or may be provided with a clamp or other regulator to limit or eliminate flow through the artery.

Disposed along the aorta 82 above the hepatic artery 102 is a glomerulus 110 which provides a bypass around a clamp 114. In reality, each human kidney has about 1 million glomeruli. However, the functioning of the glomeruli can be adequately simulated by a one or two large channels, as shown in FIG. 1.

Once beyond the glomeruli 110, the fluid passes through a plurality of channels 120 which represent the arteries, veins and capillaries of the body in general. A vent 122 is provided above the body 120 for air control within the system 10. The vent 122 prevents pockets of air forming so as to interfere with the flow of fluid through the system 10.

Once the fluid has passed through the body 120, the fluid passes through a flow meter 124 which comprises a u-shaped area bordered by a plurality of smaller channels 128. As will be explained in more detail regarding FIG. 2, the fluid passing through the channels 128 will rise to a certain level depending on the flow rate of the fluid. A plurality of markings 132 adjacent to the channels 128 indicate the flow rate of the fluid in liters per minute. Such a flow meter 124 is commonly referred to as a Miner's inch.

To the left and below the Miner's inch flow meter 124 is the vena cava 140 which descends down into the right atrial reservoir 22. Marks 144 adjacent to the vena cava 140 indicate the pressure in the right atrial reservoir 22. While this pressure is typically 0 to 6 mmHg., it can reach as high as 20 mm Hg. during right ventricle 14 failure.

Extending from the vena cava 140 is the portal vein 150, which along with the hepatic artery 102, flows into the liver 160. Portal hypertension occurs when circulation through this general area is impeded, as is the case with cirrhosis of the liver and Budd-Chiari syndrome. Portal hypertension can be demonstrated by tightening a clamp 164 or otherwise restricting flow (i.e., simply applying external pressure to the channels of the liver 160). The extent of the hypertension is indicated by the level of fluid in the channel 170.

Fluid exiting the liver 160 passes through the hepatic vein 174 and into the right atrial reservoir 22. The bottom of the reservoir 22 has a drain 180 for lowering the amount of fluid in the system 10, or for draining the system altogether. Also shown in FIG. 1 is a funnel 190 which can be used to quickly fill the system 10 with fluid.

Figure 2:
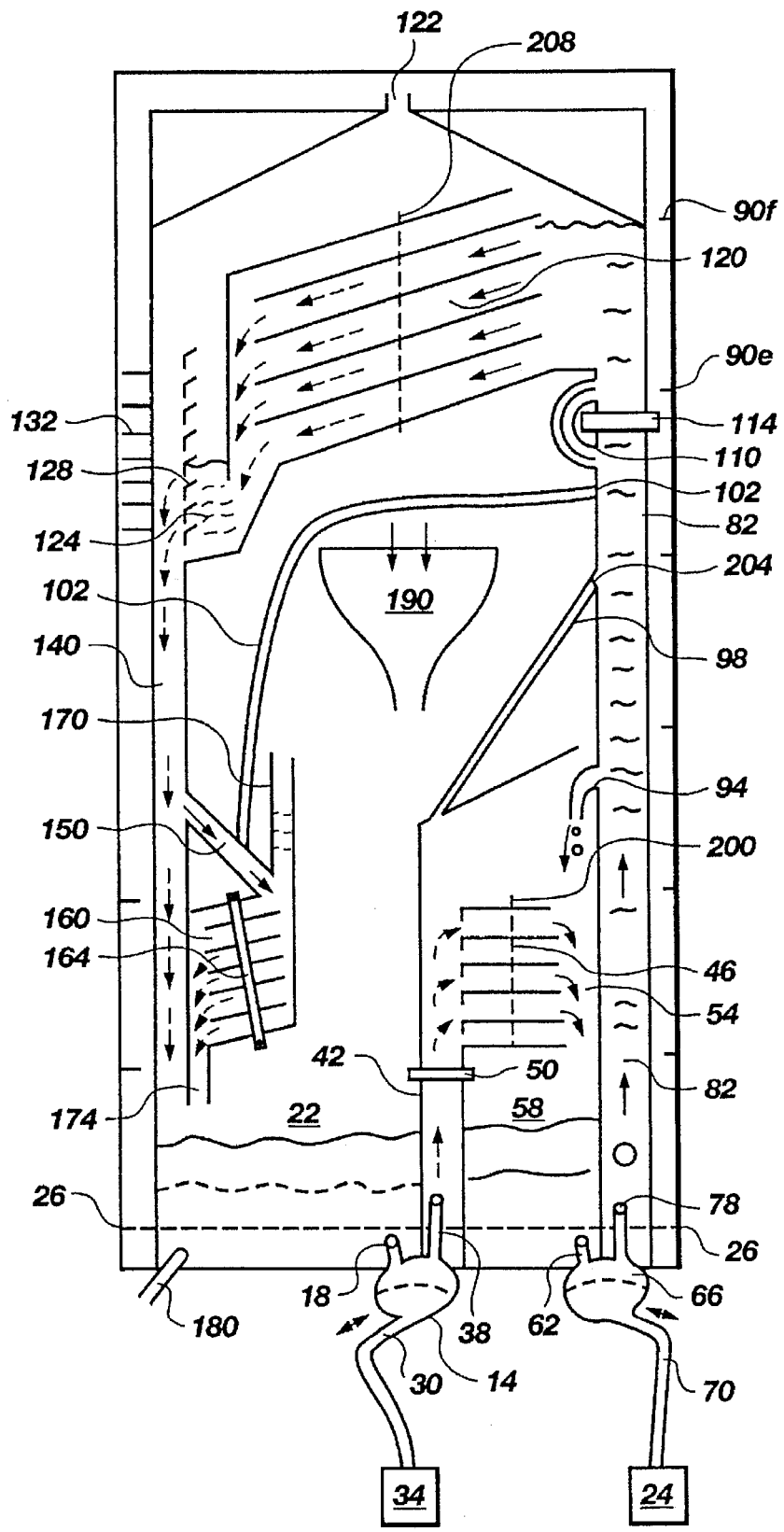
FIG. 2 shows a mock circulation system made in accordance with the principles of the present invention and as shown in FIG. 1; the mock circulation system having fluid contained therein to simulate blood within a real circulation system.

Referring now to FIG. 2, there is shown a mock circulation system 10 as shown in FIG. 1 with fluid present. Some of the many circulatory conditions which may be simulated will be discussed relative to the fluid and the structure. Throughout FIG. 2, oxygenated "blood" will be represented by solid lines and arrows, and deoxygenated blood will be represented by dashed lines and arrows. When the mock circulation system 10 is used for teaching, a colored background, such as red and blue tape, will generally be used to designate the portions of the system which would contain oxygenated and deoxygenated "blood", respectively, if it were a real circulation system.

Beginning with the right atrial reservoir 22, the deoxygenated "blood" (usually water) collects in the reservoir. Because the right ventricle 14 does not create a negative pressure, thereby sucking fluid through the ventricle inlet 18, the amount of fluid forced into the right ventricle is dependant on the pressure (height of the fluid) in the right atrial reservoir 22. Greater levels of fluid in the reservoir 22, causes more fluid to be forced into the right ventricle 14, thereby increasing its pumping capacity.

To demonstrate the effects of right heart failure, the driver 34 is stopped so that it does not pump the right ventricle 14. While some fluid will pass through the right ventricle 14 due to the pressure in the right atrial reservoir 22, the right atrial reservoir 22 will begin to fill and may reach as high as 20 mm Hg. This filling shifts the fluid balance within the system 10 and represents the fluid shift caused by right ventricle failure in a human. Those skilled in the art will recognize that the passive diffusion through the right ventricle 14 makes right heart failure less dangerous, as the build-up of fluid occurs at a moderate rate compared to left ventricle failure discussed below.

The effect of severe bleeding can also be shown by using the drain 180. When significant amounts of fluid are removed, the right atrial reservoir 22 has little fluid to supply to the right ventricle. Because cardiac output is determined by venous pressure (see Starling's Law discussed regarding FIGS. 4 through 4B), the low pressure in the reservoir 22 causes the output of the right ventricle 14 to drop dramatically, decreasing "blood" supply to the lung 46 and the left ventricle 66.

When the right ventricle 14 is operating normally, the deoxygenated blood passes into the pulmonary artery 42. The height of the water column in the pulmonary artery 42 indicates the diastolic pressure between 10 and 20 mm Hg., which is higher than the normal value (usually 6 mm Hg.) at rest. The clamp 50 can be used to simulate higher pressures which occur with various circulatory problems.

From the pulmonary artery 42, the fluid passes through the lung 46 where it is reoxygenated. In FIG. 2, this is shown by the solid arrows in the channel 54. In actual use, however, the reoxygenation of the "blood" will typically be demonstrated by having blue background on the left side of the dashed line 200 and red background on the right side, thus teaching that the "blood" is reoxygenated as it passes through the lung 46.

The reoxygenated fluid passes through the channel 54 into the left atrial reservoir 58. As will be appreciated by those skilled in the art, the fluid in the left atrial reservoir 58 represents the blood volumes in the lungs returning to the left atrium via the pulmonary veins and is smaller than the volume of the right atrial reservoir 22. From the left atrial reservoir 58, the fluid passes through the ventricle inlet 62 and into the left ventricle 66. To demonstrate left heart failure, the drive 74 is turned off, or some modification is made so that pumping pressure is not conveyed through the inlet/outlet line 70. The danger of left heart failure becomes apparent as the fluid level in the left atrial reservoir 58 rapidly rises due to the continued supply of fluid from the lung 46 and little if any diffusion of fluid through the left ventricle 66.

When the left ventricle 66 is functioning properly, the fluid is pumped through the outlet 78 and into the aorta 82. As shown in FIG. 2, the pressure in the aorta is 60 mmHg, as is demonstrated by the fluid level reaching marking 90f. A small amount of fluid returns to the channel 54 via the bronchial arteries 94. Further up the aorta 82, the ductus Botalli 98 is closed by a clamp 204 to simulate the lack of flow in a typical human. Above the ductus Botalli 98, the hepatic artery 102 remains open and supplies a small amount of oxygenated "blood" to the liver 160.

Above the hepatic artery 102, the fluid passes through the glomerulus 110. The rate at which the fluid passes through the glomerulus 110, as well as the percentage of fluid bypassing it, is determined by adjusting the clamp 114. Once past the clamp 114, the fluid height indicates the diastolic pressure on the aorta. The fluid then passes through he channels representing the body 120. As the fluid passes through the body 120, the background color is changed (such as at the dashed line 208) to indicate the deoxygenation of the "blood".

Once the fluid has passed through the body 120, it enters the Miner's inch flow meter 124. The fluid passes through the channels 128. The faster the fluid flow, the higher the fluid will rise adjacent to the channels 128. As shown in FIG. 2, the fluid level in the flow meter has risen to about 3.5 inches, indicating that circulation within the system 10 is 3.5 liters per minute, a typical quantity for the model presented. By dividing the flow rate by the number of strokes per minute, the stroke volume of the ventricles 14 and 66 can also be determined.

Portal circulation is demonstrated below the flow meter 124. Blood from the mesenteric veins, having served the intestines, the spleen and the pancreas (all represented by the body), returns via the portal vein 150 to the liver 160 and from there, via the hepatic vein 174 to the vena cava 140. Thus, the liver 160 is between two venous systems, the portal 150 and vena cava 140. The liver 160 also receives a small amount of fluid from the hepatic artery 102. Portal hypertension occurs when portal circulation is inhibited, such as occurs with cirrhosis of the liver. This condition is demonstrated by tightening the clamp 164 or otherwise placing pressure on the channels to reduce flow therethrough. Portal hypertension is visible by the rise in fluid level in the channel 170 above the liver 160. The fluid passing through the liver 160 passes through the hepatic vein 174 and into the right atrial reservoir 22 where it repeats the cycle.

The housing 12 discussed relative to FIGS. 1 and 2 can be formed in a variety of ways. In a preferred embodiment, the housing 12 is formed by a twenty mil sheet of polyurethane which is heated with calrod heaters to its forming temperature and then formed by sucking the polyurethane into a wooden female mold. Vacuum formed ports are dielectrically welded to the sheet and the assembly is dielectrically welded to a flat bottom sheet to thereby form the housing and the channels therein. The resulting housing 12 (FIGS. 1 and 2) is flexible & easily compacted. Such a method for producing the housing 12 allows the system to be produced at a much lower cost than the bulkier and less useful systems of the prior art. The lower cost and ease of production will allow many more mock circulation systems to be used for testing and teaching. Those skilled in the art will recognize numerous different ways of forming such housings, such as other formation methods, and even using a plurality of separate tubes to form the channels of the housing.

When the system 10 is not in use, and it is to be stored or moved, the fluid in the housing 12 is removed via the drain 180 and the ventricles 14 and 66 are removed from the ports 16, 40, 60 and 80. The housing 12 can then be folded or rolled up to be more convenient for storage or moving. When the system 10 is again desired for use, it may be quickly unfolded or unrolled, and hung against a wall or other support and the ventricles 14 and 66 reattached. The fluid in the housing 12 can quickly be replenished by using the funnel 190. The benefits of such a portable, simple system will be apparent to those familiar with mock circulation systems, especially salesman of medical devices. Rather than carrying a bulky system which only represents the heart, etc., a medium sized gym bag can be used to transport a mock circulation system which simulates almost the entire human circulatory system.

Figure 3:
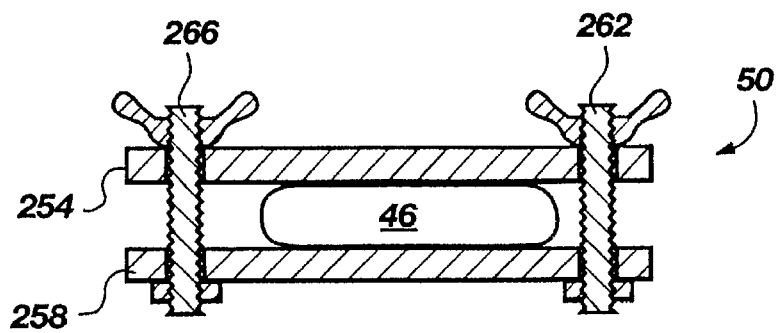
FIG. 3 shows a side cross-sectional view of a clamp as may be used at numerous locations on the mock circulation system to simulate various circulatory conditions.

Referring now to FIG. 3, there is shown a side cross-sectional view of the clamp 50 (FIGS. 1 and 2) which may be used to adjust pressure on the pulmonary artery 46 so as to simulate different circulatory conditions. Similar clamps can be placed on nearly any of the channels to adjust pressure and demonstrate the systemic effects which partial or complete obstruction of the channel would create.

The clamp 50 contains a pair of opposing members, 254 and 258, which are held together by a pair of adjusters 262 and 266, respectively. Preferentially, the adjusters will be bolts with butterfly nuts (as shown in FIG. 3), or something analogous to simplify tightening or loosening of the clamp 50. To restrict flow through the pulmonary artery 46, the nuts are rotated so as to draw the opposing members 254 and 258 closer together. Obviously, the degree of restriction will be determined by the size of the channel, as well as the distance between the opposers.

By providing a plurality of such clamps on the housing, as shown in FIGS. 1 and 2 at 114 and 164, and potentially at 96 and 204, many different circulatory conditions can be simulated with very little difficulty, and without the complex electronic and mechanical components in some of the prior art. In the alternative, restriction can be provided simply by placing one's hands on either side of the housing and pressing together.

Figure 4A:
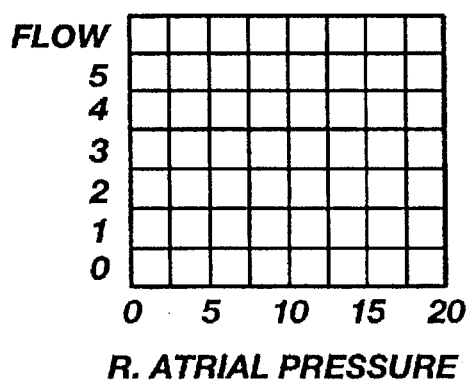
FIGS. 4, 4A, and 4B show three charts which may be used with the present invention to graph curves in accordance with Starling's Law.
Figure 4B:
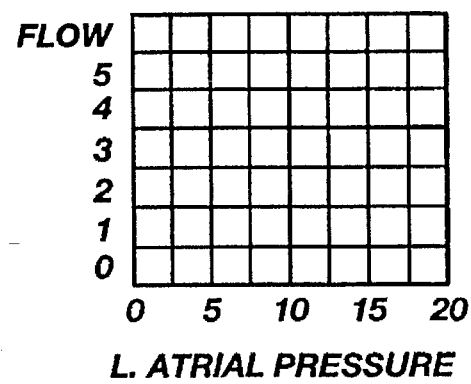
Figure 4:
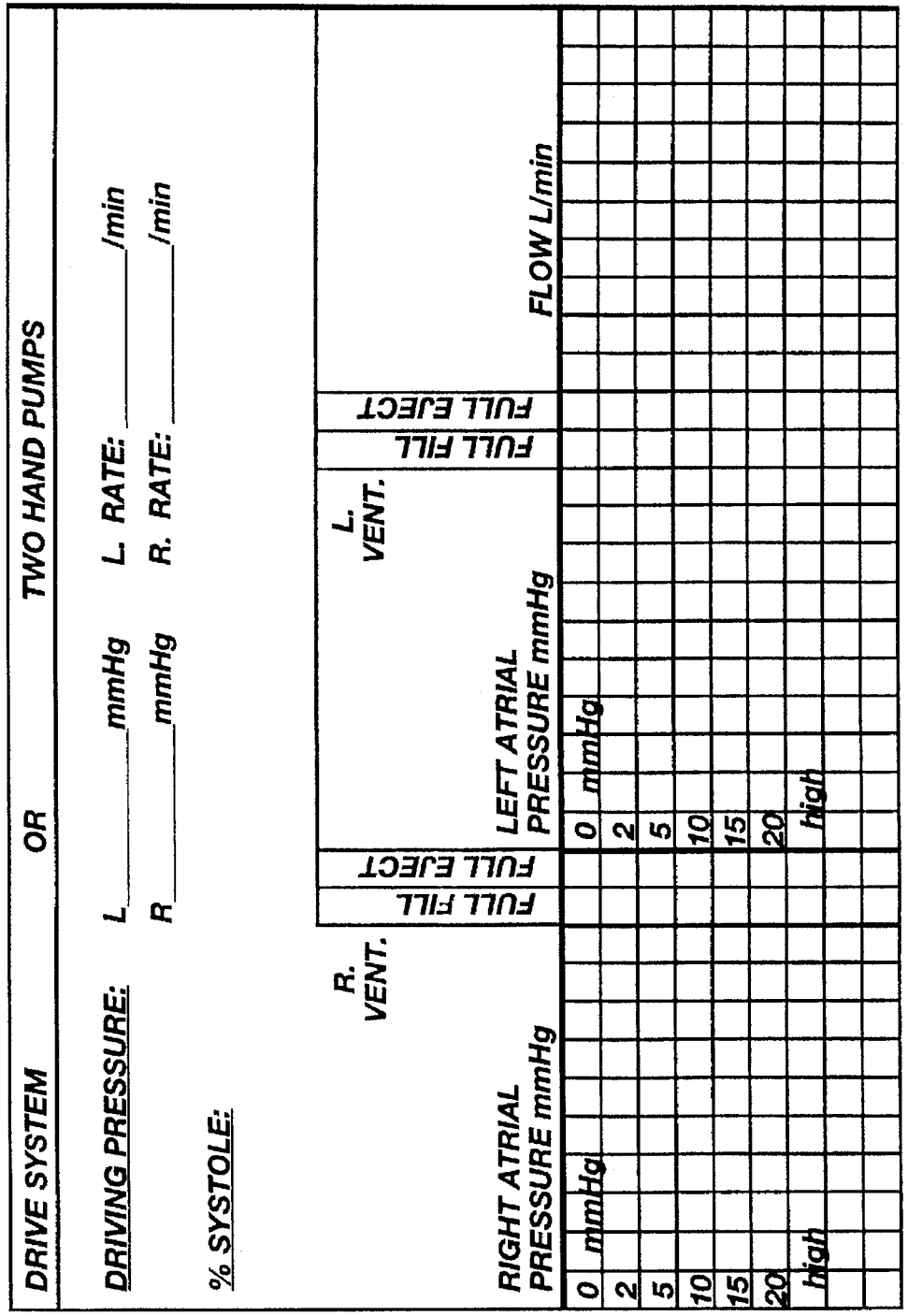

Referring now to FIGS. 4 through 4B, there are shown graphs which may be used to demonstrate Starling's Law within the system. To facilitate construction of a Starling's law curve, a fluid filled bag is connected to the drain 180 (FIGS. 1 and 2), and the drain left open. By adjusting the height of the bag, the volume of the right atrial reservoir 22 (FIGS. 1 and 2) can be adjusted. To construct a Starling's Law curve, water should be added to obtain a fluid level in the right and left atrial reservoirs, 22 and 58 respectively, of 15 mm Hg. (20 cm $H_2O$). The left ventricle 66 is then pumped at 60 strokes per minute. Equilibrium of 15 mmHg. of fluid in both the left and right atrial reservoirs 58 and 22 is maintained by adjusting the pumping rate of the right ventricle 14 and by adding or withdrawing water. Once equilibrium is established, the pumping rate is held constant and the atrial pressure and cardiac output (measured by the Miner's inch flow meter 124 in FIGS. 1 and 2) are noted.

Water is then drained from the right atrial reservoir 22 by the drain 180 (i.e. lowering the bag). As fluid is drained from the right atrial reservoir 22, the ventricles do not completely fill and the "blood" flow rate decreases, as indicated by the flow meter 124. When properly pumped, the ventricles empty with each stroke. Therefore, reduced filling will lead to a decrease in overall cardiac output. By plotting the changing pressure and flow, a curve is produced for the given variables demonstrating Starling's Law that venous pressure determines cardiac output.

In the manner described, an improved mock circulation system is provided. The system includes a housing with a plurality of channels formed therein to simulate a human circulation system. Unlike other systems currently available, the system is inexpensive, lightweight, collapsible and portable. Additionally, the system allows the user to observe a relatively complete circulation system and the dynamic effects which a change at one position along the circulation path has on other portions of the circulation path. It is to be understood that the above-described embodiment is only illustrative of the application of the principles of the present invention. Numerous modifications and alternative arrangements may be devised by those skilled in the art without departing from the spirit and scope of the present invention. The appended claims are intended to cover such modifications and arrangements.

We claim:

1. A portable mock circulation system for use in teaching and testing medical devices, the mock circulation system comprising:

a collapsible housing means having a plurality of channels formed therein so as to simulate a human circulation system by flow of fluid through housing means, and flow metering means for determining fluid flow rate through the housing means; and pumping means connected to the housing means for receiving fluid from the housing means and returning fluid to the housing means so as to develop a fluid flow through the channels of the housing means.

2. The portable mock circulation system of claim 1, wherein the housing means comprises measuring means for determining pressure within the system, the measuring means comprising at least one channel disposed generally vertically and a plurality of markings for determining pressure by the height of fluid within the at least one channel.

3. The portable mock circulation system of claim 1, wherein the housing means is made of a compactible, plastic material.

4. The portable mock circulation system of claim 1, wherein the flow metering means comprises a Miner's inch flow meter.

5. The portable mock circulation system of claim 1, further comprising a plurality of adjustment means coupled along the channels of the housing means for selectively restricting fluid flow through select channels of the housing means so as to selectively simulate healthy and pathological circulatory conditions.

6. The portable mock circulation system of claim 1, wherein the housing means comprises a channel for simulating fluid flow through the bronchial arteries and wherein the system further comprises adjustment means disposed adjacent the channel for simulating fluid flow through the bronchial arteries for restricting the amount of fluid flowing through the channel for simulating fluid flow through the bronchial arteries.

7. The portable mock circulation system of claim 1, wherein the housing means is made of a clear material so as to enable a user to see the flow of fluid through the housing means.

8. The portable mock circulation system of claim 1, wherein the housing means comprises a channel for simulating fluid flow through a ductus Botalli and adjustment means for selectively preventing fluid flow through the channel for simulating fluid flow through the ductus Botalli so as to alter a rate of fluid flow throughout the mock circulation system.

9. The portable mock circulation system of claim 1, wherein the housing means comprises at least one channel for simulating fluid flow through a glomeruli.

10. The portable mock circulation system of claim 1, wherein the housing means further comprises a plurality of channels for simulating fluid flow through a liver and portal vein and adjustment means for selectively restricting fluid flow through the channels for simulating fluid flow through a liver, so as to facilitate simulation of portal hypertension.

11. The portable mock circulation system of claim 1, wherein the pumping means comprises at least one artificial ventricle in fluid communication with the housing means, and driver means in communication with at least one artificial ventricle for causing the artificial ventricle to expel fluid received from the housing means back into the housing means.

12. A housing for use with a mock circulation system, the housing comprising:
a pair of plastic sheets bonded together so as to form an enclosure;
a plurality of channels formed between the plastic sheets such that passage of fluid through the channels between the plastic sheets simulates a circulation system of a living being;
a plurality of index markings so as to indicate a level of fluid within at least some of the channels; and
at least one outlet port and at least one inlet port in communication with said channels such that when fluid is placed in the channels and continuously passed out of the outlet port and into the inlet port, the fluid develops a continuous flow pattern within the channels of the housing.

13. A housing for use with a mock circulation system, the housing comprising:
a pair of plastic sheets bonded together so as to form an enclosure;
a plurality of channels formed between the plastic sheets such that passage of fluid through the channels between the plastic sheets simulates a circulation system of a living being; and
at least one outlet port and at least one inlet port in communication with said channels such that when fluid is placed in the channels and continuously passed out of the outlet port and into the inlet port, the fluid develops a continuous flow pattern within the channels of the housing, and
wherein the housing comprises a Miner's inch flow meter.

14. A system for simulating a human circulation system comprising:
a housing having,
a pair of plastic sheets bonded together so as to form an enclosure,
a plurality of channels formed between the plastic sheets such that passage of fluid through the channels between the plastic sheets simulates a circulation system of a living being, and
at least one outlet port and at least one inlet port in communication with said channels such that when fluid is placed in the channels and continuously passed out of the outlet port and into the inlet port, the fluid develops a continuous flow pattern within the channels of the housing; and
a plurality of adjustment mechanisms attached to the housing for regulating the flow of fluids through select channels of the housing, to thereby simulate different circulatory conditions.

15. A portable mock circulation system for use in teaching and testing medical devices, the mock circulation system comprising:
a collapsible housing means having a plurality of channels formed therein so as to simulate a human circulation system;
pumping means connected to the housing means means for receiving fluid from the housing and returning fluid to the housing means so as to develop a fluid flow through the channels of the housing means; and
adjustment means disposed along at least one of the plurality of channels of the housing means for selectively restricting fluid flow through one or more of the plurality of channels so as to selectively simulate healthy and pathological circulatory conditions.

16. The portable mock circulation system of claim 15, wherein the housing means comprises a channel for simulating fluid flow through the bronchial arteries, and wherein the adjustment means is disposed to selectively restrict the amount of fluid flowing through the channel for simulating fluid flow through the bronchial arteries.

17. The portable mock circulation system of claim 15, wherein the housing means comprises a plurality of channels for simulating fluid flow through a liver and portal vein and wherein the adjustment means is disposed for selectively restricting fluid flow through the channels for simulating fluid flow through a liver, so as to simulate portal hypertension.

18. A portable mock circulation system for use in teaching and testing medical devices, the mock circulation system comprising:
a collapsible housing means having a plurality of channels formed therein so as to simulate a human circulation system;

pumping means connected to the housing means for receiving fluid from the housing means and returning fluid to the housing means so as to develop a fluid flow through the channels of the housing means; and measuring means formed by the housing means for determining simulated pressure within the system, the measuring means comprising at least one channel disposed generally vertically and a plurality of markings for determining simulated pressure by the height of fluid within the at least one channel.

19. A portable mock circulation system for use in teaching and testing medical devices, the mock circulation system comprising:

a collapsible housing means having a plurality of channels formed therein so as to simulate a human circulation system;

pumping means connected to the housing means for receiving fluid from the housing means and returning fluid to the housing means so as to develop a fluid flow through the channels of the housing means; and wherein the housing means is made of a clear material so as to enable a user to see the fluid flow through the housing means.

* * * * *